(12) United States Patent
Rochat et al.

(10) Patent No.: US 9,131,721 B2
(45) Date of Patent: Sep. 15, 2015

(54) GUT MICROBIOTA IN INFANTS

(75) Inventors: Florence Rochat, Montreux (CH); Marie-Christine Secretin, Blonay (CH)

(73) Assignee: Nestec S.A., Vevey (CH)

( * ) Notice: Subject to any disclaimer, the term of this patent is extended or adjusted under 35 U.S.C. 154(b) by 513 days.

(21) Appl. No.: 12/326,368

(22) Filed: Dec. 2, 2008

(65) Prior Publication Data

US 2009/0142442 A1     Jun. 4, 2009

(30) Foreign Application Priority Data

Dec. 4, 2007   (EP) .................................... 07023460

(51) Int. Cl.
| | |
|---|---|
| *A23C 9/123* | (2006.01) |
| *A23C 21/00* | (2006.01) |
| *A23L 1/29* | (2006.01) |
| *A23L 1/09* | (2006.01) |
| *A23L 1/236* | (2006.01) |
| *A23L 1/30* | (2006.01) |
| *A23L 1/302* | (2006.01) |
| *A23L 1/304* | (2006.01) |
| *A23L 1/305* | (2006.01) |
| *A23L 1/00* | (2006.01) |

(52) U.S. Cl.
CPC . *A23L 1/296* (2013.01); *A23L 1/09* (2013.01); *A23L 1/2363* (2013.01); *A23L 1/302* (2013.01); *A23L 1/304* (2013.01); *A23L 1/3008* (2013.01); *A23L 1/3056* (2013.01); *A23V 2002/00* (2013.01)

(58) Field of Classification Search
CPC ................. A23V 2002/00; A23V 2200/3202; A23V 2250/5452
USPC ....................................................... 426/583
See application file for complete search history.

(56) References Cited

U.S. PATENT DOCUMENTS

| | | | |
|---|---|---|---|
| 5,039,532 A * | 8/1991 | Jost et al. ........................ 426/41 |
| 6,589,576 B2 * | 7/2003 | Borschel et al. ................ 426/72 |
| 6,777,391 B1 * | 8/2004 | Kratky et al. ................... 514/23 |
| 2007/0207132 A1 * | 9/2007 | Speelmans et al. ........ 424/93.45 |
| 2008/0317916 A1 * | 12/2008 | Erdmann et al. ............. 426/281 |

FOREIGN PATENT DOCUMENTS

| | | |
|---|---|---|
| EP | 0671126 | 9/1995 |
| WO | WO 0141581 | 6/2001 |
| WO | WO 2004112507 | 12/2004 |
| WO | WO 2004112508 | 12/2004 |
| WO | WO 2006108824 | 10/2006 |
| WO | WO 2006130204 | 12/2006 |

OTHER PUBLICATIONS

Rochat et al., A Whey-Predominant Formula Induces Fecal Microbiota Similar to That Found in Breast-Fed Infants, Nutrition Research 27, 735-740, Nov. 28, 2007.*
Simopoulos, The Importance of the Ratio of Omeag-6/Omega-3 Essential Fatty Acids, Biomed Pharmacother 56, 56 (2002), 365-379.*
Flax, The Importance of Fatty Acids, Golden Valley, p. 4, (2006).*
T.D. Cleary, "Human milk protective mechanisms." Adv Exp Med Biol, 2004, 554, pp. 145-154.
S. Salminen et al., "Probiotics that modify disease risk," J Nutr, 2005,135, pp. 1294-1298.
Laitinen et al., "Evaluation of diet and growth in children with and without atopic eczema: follow-up study from birth to four years," Brit J Nutr, 2005, 94, pp. 565-574.
G. Fantuzzi, "Adipose tissue, adipokines, and inflammation," J Allergy Clin Immunol., 2005,115, pp. 911-919.
F. Bäckhed et al., "The gut microbiota as an environmental factor that regulates fat storage," Proc Natl Acad Sci USA. 2004,101, pp. 15718-15723.
F. Rochat et al., "A whey-predominant formula induces fecal microbiota similar to that found in breast-fed infants," Nutrition Research, vol. 27, Issue 12, (Dec. 2007), pp. 735-740.

* cited by examiner

*Primary Examiner* — D Lawrence Tarazano
*Assistant Examiner* — Philip Dubois
(74) *Attorney, Agent, or Firm* — K&L Gates LLP

(57) ABSTRACT

The use of a whey predominant protein source and lactose in the manufacture of a nutritional composition for promoting the development of an early bifidogenic intestinal microbiota in infants fed with the nutritional composition wherein the nutritional composition has a protein content of less than 2.1 g protein/100 kcal and a phosphorus content of less than 40 mg/100 kcal.

24 Claims, No Drawings

GUT MICROBIOTA IN INFANTS

FIELD OF THE INVENTION

The present invention relates to the improvement of gut microbiota in infants who are not breast-fed.

BACKGROUND

Mother's milk is recommended for all infants. However, in some cases breast feeding is inadequate or unsuccessful for medical reasons or the mother chooses not to breast feed. Infant formulas have been developed for these situations.

Immediately before birth, the gastro-intestinal tract of a baby is thought to be sterile. During the normal process of birth, it encounters bacteria from the digestive tract, skin and environment of the mother and starts to become colonized. The gut microbiota of infants is usually heterogeneous during the first few days of life, independent of feeding habits. However, during the months prior to weaning differences in the microbiota composition between breast-fed and formula-fed infants are apparent. These differences in the microbiota may partly explain the lower incidence of intestinal infection observed in breast-fed infants compared with formula-fed infants. In full-term infants, breast feeding induces the development of a microbiota rich in *Bifidobacterium* sp. Other anaerobes such as *Clostridium* sp. and *Bacteroides* sp. are more rarely isolated, and facultative anaerobes such as *Escherichia* sp. and enterococci are even less numerous. In contrast to breast-fed infants, formula-fed infants are often colonized by a more diverse microbiota including *Clostridium perfringens, Escherichia coli* and *Bacteroides* in addition to bifidobacteria. After the completion of weaning, a pattern of gut microbiota that resembles the adult pattern becomes established.

The new generations of infant formulas are designed to mimic the health advantages of human milk. One approach is to attempt to modify the intestinal microbiota by supplementing formulas with components that are recognized to promote the proliferation of Bifidobacteria. For example, research into the composition of human milk and the way this changes over the period of lactation suggests that the type and concentration of protein in human milk are likely to affect the gut microbiota, and changing these parameters in formulas may improve their bifidogenic properties.

Breast-fed infants are better protected against infections of the GI, respiratory, and urinary tracts as well as other diseases compared with those who are formula-fed (Cleary T. D. "Human milk protective mechanisms" Adv Exp Med Biol 2004; 554:145-54). Salminen and co-workers have attributed this effect at least partly to differences in microbiota composition (Salminen S. J., Gueimonde M., Isolauri E., "Probiotics that modify disease risk". J Nutr 2005; 135:1294-8).

Further, it has been suggested that aberrant colonization of the infant gut may have specific consequences in terms of the subsequent development of the infant. For example, Laitinen et al found that failure to establish an early bifidogenic microflora may be an additional risk factor for wheezing and allergic sensitization to food allergens (Laitinen et al "Evaluation of diet and growth in children with and without atopic eczema: follow-up study from birth to four years" Brit J Nutr 2005; 94: 565-74). It has also been suggested that systemic low-grade inflammation and a sub-optimal gut microbiota may be implicated in the development of obesity (Fantuzzi G. "Adipose tissue, adipokines, and inflammation" J Allergy Clin Immunol. 2005; 115:911-919, Bäckhed F, Ding H, Wang T, et al. "The gut microbiota as an environmental factor that regulates fat storage" Proc Natl Acad Sci USA. 2004; 101: 15718-15723).

Given the characteristic gut microbiota of breast-fed infants and the associated health benefits such as protection against infections, there is a real need to develop formulas with similar properties to human milk to ensure that infants who cannot be breast-fed obtain at least some of the beneficial effects conferred by human milk.

SUMMARY

The present inventors have found that the development of an early bifidogenic intestinal microbiota in formula-fed infants may be enhanced by feeding the infants an infant formula which is whey predominant, has a relatively low protein content, a relatively low phosphorus content and in which the majority of the carbohydrate content is supplied by lactose. Surprisingly feeding an infant formula with these characteristics may influence the development of an infant's microbiota in a similar way to breast milk, including for example reduced colonization by undesirable species such as *Clostridia, Enterobacteria* and *Enterococci.*

Accordingly the present invention provides the use of a whey predominant protein source and lactose in the manufacture of a nutritional composition for promoting the development of an early bifidogenic intestinal microbiota in infants fed with the nutritional composition wherein the nutritional composition has a protein content of less than 2.1 g protein/100 kcal and a phosphorus content of less than 40 mg/100 kcal.

The invention further provides the use of a whey predominant protein source and lactose in the manufacture of a nutritional composition for reducing the risk of subsequent development of allergy in infants fed with the nutritional composition wherein the nutritional composition has a protein content of less than 2.1 g protein/100 kcal and a phosphorus content of less than 40 mg/100 kcal.

The invention extends to a method of promoting the development of an early bifidogenic intestinal microbiota in an infant comprising feeding to an infant in need of the same a therapeutic amount of a nutritional composition comprising a whey predominant protein source and lactose and having a protein content of less than 2.1 g protein/100 kcal and a phosphorus content of less than 40 mg/100 kcal.

The invention further extends to a method of reducing the risk that an infant will subsequently develop an allergy comprising feeding to an infant in need of the same a therapeutic amount of a nutritional composition comprising a whey predominant protein source and lactose and having a protein content of less than 2.1 g protein/100 kcal and a phosphorus content of less than 40 mg/100 kcal.

Without wishing to be bound by theory, the present inventors believe that a combination of a whey predominant protein source with a relatively low content of protein, the use of lactose as a carbohydrate source and a relatively low phosphorus content favor the development of an early bifidogenic microflora comparable with that found in breast-fed infants. In a previous study they inventors compared the effect on faecal bacterial counts of feeding infants whey-predominant formula (60% whey protein, 40% casein) with or without bifidobacteria or human milk. It was observed that infants who were fed the whey-predominant infant formula without added bifidobacteria had mean stool counts of bifidobacteria, Bacteroides, and aerobic bacteria comparable to those of their breast-fed counterparts. In another study in which infants were fed a soy-based formula no such effect was observed in the gut microbiota composition (unpublished data) suggesting that the use of a whey-predominant protein source may be implicated in promoting a gut microbiota closer to that of breast-fed infants. It is also believed that the low phosphorus concentration gives a buffering capacity similar to that of human milk, whilst lactose fermentation maintains the intestinal acidity favorable for the proliferation of bifidobacteria and unfavorable to potentially pathogenic bacteria such as *C. perfringens* or *C. difficile*. Further, the protein content of human milk varies between 1.6-1.9 g protein/100 kcal during the first two months of lactation whereas standard infant formulas typically contain 2.5 g protein/100 kcal.

The present inventors have demonstrated that feeding an infant formula with these characteristics promotes the establishment of an early bifidogenic intestinal microflora. It may thus be expected to reduce the risk of infections of the gastrointestinal, respiratory, and urinary tracts as well as the risk of subsequent development of allergy.

Additional features and advantages are described herein, and will be apparent from the following Detailed Description.

DETAILED DESCRIPTION

In this specification, the following terms have the following meanings:

"early bifidogenic intestinal microbiota" means for an infant up to the age of 12 months an intestinal microbiota which is dominated by Bifidobacteria such as *Bifidobacterium breve*, *Bifidobacterium infantis*, and *Bifidobacterium longum* to the exclusion of appreciable populations of such species as *Clostridia* and *Streptococci* and which is generally comparable with that found in a breast fed infant of the same age;

"infant" means a child under the age of 12 months;

"infant formula" means a foodstuff intended for particular nutritional use by infants during the first four to six months of life and satisfying by itself the nutritional requirements of this category of persons;

"whey predominant protein source" means a protein source in which the whey:casein ratio is at least 50:50.

All references to percentages are percentages by weight unless otherwise stated.

Preferably the nutritional composition is an infant formula.

Preferably, the whey:casein ratio is at least 60:40. A preferred phosphorus content is in the range from 26 to 33 mg/100 kcal. Advantageously, the ratio between calcium and phosphorus in the composition is also controlled between 1.8 and 2.0 to further improve the buffering capacity.

An infant formula for use according to the present invention may contain a protein source in an amount of not more than 2.1 g/100 kcal, preferably 1.7 to 1.9 g/100 kcal. At least 50% by weight of the protein source is whey although the type of protein is not otherwise believed to be critical to the present invention provided that the minimum requirements for essential amino acid content are met and satisfactory growth is ensured. Thus, protein sources including casein and soy and mixtures thereof may be used. As far as whey proteins are concerned, the protein source may be based on acid whey or sweet whey or mixtures thereof and may include alpha-lactalbumin and beta-lactoglobulin in whatever proportions are desired.

The proteins may be intact or hydrolysed or a mixture of intact and hydrolysed proteins. It may be desirable to supply partially hydrolysed proteins (degree of hydrolysis between 2 and 20%), for example for infants believed to be at risk of developing cows' milk allergy. If hydrolysed proteins are required, the hydrolysis process may be carried out as desired and as is known in the art. For example, a whey protein hydrolysate may be prepared by enzymatically hydrolysing the whey fraction in one or more steps. If the whey fraction used as the starting material is substantially lactose free, it is found that the protein suffers much less lysine blockage during the hydrolysis process. This enables the extent of lysine blockage to be reduced from about 15% by weight of total lysine to less than about 10% by weight of lysine; for example about 7% by weight of lysine which greatly improves the nutritional quality of the protein source.

The infant formula includes lactose, preferably at a minimum lactose content of 10 g/100 kcal. Advantageously, lactose will be the only carbohydrate source in the formula although small quantities of other carbohydrates conventionally found in infant formulas such as saccharose, maltodextrin, starch and mixtures thereof may be included. Preferably the carbohydrate sources contribute between 35 and 65% of the total energy of the formula.

The infant formula may contain a source of lipids. The lipid source may be any lipid or fat which is suitable for use in infant formulas. Preferred fat sources include palm olein, high oleic sunflower oil and high oleic safflower oil. The essential fatty acids linoleic and α-linolenic acid may also be added as may small amounts of oils containing high quantities of preformed arachidonic acid and docosahexaenoic acid such as fish oils or microbial oils. In total, the fat content is preferably such as to contribute between 30 to 55% of the total energy of the formula. The fat source preferably has a ratio of n-6 to n-3 fatty acids of about 5:1 to about 15:1; for example about 8:1 to about 10:1.

The infant formula may also contain all vitamins and minerals understood to be essential in the daily diet and in nutritionally significant amounts. Minimum requirements have been established for certain vitamins and minerals. Examples of minerals, vitamins and other nutrients optionally present in the infant formula include vitamin A, vitamin B1, vitamin B2, vitamin B6, vitamin B12, vitamin E, vitamin K, vitamin C, vitamin D, folic acid, inositol, niacin, biotin, pantothenic acid, choline, calcium, phosphorous, iodine, iron, magnesium, copper, zinc, manganese, chloride, potassium, sodium, selenium, chromium, molybdenum, taurine, and L-carnitine. Minerals are usually added in salt form. The presence and amounts of specific minerals and other vitamins will vary depending on the intended infant population.

If necessary, the infant formula may contain emulsifiers and stabilizers such as soy lecithin, citric acid esters of mono- and di-glycerides, and the like.

The infant formula may optionally contain other substances which may have a beneficial effect such as probiotics, prebiotics, fibres, lactoferrin, nucleotides, nucleosides, and the like.

The infant formula may be prepared in any suitable manner. For example, it may be prepared by blending together the protein, the carbohydrate source, and the fat source in appropriate proportions. If used, the emulsifiers may be included at this point. The vitamins and minerals may be added at this point but are usually added later to avoid thermal degradation. Any lipophilic vitamins, emulsifiers and the like may be dissolved into the fat source prior to blending. Water, preferably water which has been subjected to reverse osmosis, may then be mixed in to form a liquid mixture. The temperature of the water is conveniently about 50° C. to about 80° C. to aid dispersal of the ingredients. Commercially available liquefiers may be used to form the liquid mixture. The liquid mixture is then homogenized; for example in two stages.

The liquid mixture may then be thermally treated to reduce bacterial loads, by rapidly heating the liquid mixture to a temperature in the range of about 80° C. to about 150° C. for about 5 seconds to about 5 minutes, for example. This may be carried out by steam injection, autoclave or by heat exchanger; for example a plate heat exchanger.

Then, the liquid mixture may be cooled to about 60° C. to about 85° C.; for example by flash cooling. The liquid mixture may then be again homogenized; for example in two stages at about 10 MPa to about 30 MPa in the first stage and about 2 MPa to about 10 MPa in the second stage. The homogenized mixture may then be further cooled to add any heat sensitive components; such as vitamins and minerals. The pH and solids content of the homogenized mixture are conveniently adjusted at this point.

The homogenized mixture is transferred to a suitable drying apparatus such as a spray drier or freeze drier and converted to powder. The powder should have a moisture content of less than about 5% by weight.

By way of example and not limitation, the invention will now be further illustrated by reference to the following examples:

Example 1

An example of the composition of a suitable infant formula to be used in the present invention is given below

| Nutrient | per 100 kcal | per litre |
| --- | --- | --- |
| Energy (kcal) | 100 | 670 |
| Protein (g) | 1.83 | 12.3 |
| Fat (g) | 5.3 | 35.7 |
| Linoleic acid (g) | 0.79 | 5.3 |
| α-Linolenic acid (mg) | 101 | 675 |
| Lactose (g) | 11.2 | 74.7 |
| Minerals (g) | 0.37 | 2.5 |
| Na (mg) | 23 | 150 |
| K (mg) | 89 | 590 |
| Cl (mg) | 64 | 430 |
| Ca (mg) | 62 | 410 |
| P (mg) | 31 | 210 |
| Mg (mg) | 7 | 50 |
| Mn (µg) | 8 | 50 |
| Se (µg) | 2 | 13 |
| Vitamin A (µg RE) | 105 | 700 |
| Vitamin D (µg) | 1.5 | 10 |
| Vitamin E (mg TE) | 0.8 | 5.4 |
| Vitamin K1 (µg) | 8 | 54 |
| Vitamin C (mg) | 10 | 67 |
| Vitamin B1 (mg) | 0.07 | 0.47 |
| Vitamin B2 (mg) | 0.15 | 1.0 |
| Niacin (mg) | 1 | 6.7 |
| Vitamin B6 (mg) | 0.075 | 0.50 |
| Folic acid (µg) | 9 | 60 |
| Pantothenic acid (mg) | 0.45 | 3 |
| Vitamin B12 (µg) | 0.3 | 2 |
| Biotin (µg) | 2.2 | 15 |
| Choline (mg) | 10 | 67 |
| Fe (mg) | 1.2 | 8 |
| I (µg) | 15 | 100 |
| Cu (mg) | 0.06 | 0.4 |
| Zn (mg) | 0.75 | 5 |

Example 2

In the study described below, the present inventors sought to emulate some of the properties of breast-milk by altering the concentration of existing components of infant formulas so that the composition better resembled that of human milk. This formula was whey-predominant (70% whey, 30% casein), had reduced protein (1.8 g/100 kcal) and low phosphorus (31 mg/100 kcal) concentration, and lactose as the sole source of carbohydrate. The faecal microbiota compositions of infants fed this formula were compared with those of infants who were exclusively breast-fed.

Methods and Materials

Healthy full-term infants (gestational age between 37 and 42 weeks), less than 28 days of age and weighing between 2,500 and 4,200 g were enrolled in the study if they were being exclusively fed with either formula or breast milk by enrolment. Infants with congenital abnormalities or illnesses, including cardiovascular, gastro-intestinal (GI), renal, neurological, and/or metabolic disorders were excluded. Furthermore, infants who had been admitted to intensive care or had required hospital readmission in the first 28 days of life, or who were participating in another clinical trial were excluded.

Study Design

This was a prospective, open, parallel-group clinical trial in which infants were fed either the study formula or breast milk ad libitum. Upon enrolment, infants in the formula-fed group received the study formula, to be used exclusively until they were at least four months (120 days±4 days) of age. Infants in the control group were exclusively breast-fed from birth up to 60 (±3) days of age. Follow-up visits took place at 30 (±2) and 60 (±3) days of age for both groups and additionally at days 90 (±3) and 120 (±4) for the formula-fed group. The investigator recorded weight, recumbent length, and head circumference of infants during these visits. Whenever possible, fresh stool samples were collected from infants on days 30 and 60 (some infants could not provide stool samples during visits) for bacteriological analyses.

The study was carried out at the Neonatologia, Istituto di Ostetricia e Ginecologia dell'Universita di Palermo (Italy), and the ethical committee of Universita di Palermo approved the protocol and human use. Signed informed consent forms were obtained from parents. The study was conducted according to good clinical practices and in conformity to the Declaration of Helsinki and its subsequent amendments.

Study Formula

The study formula, NAN® (Nestlé, Switzerland), is a reduced protein (1.8 g/100 kcal) infant formula with whey as the predominant (70%) protein source and lactose as the sole carbohydrate source, and contained 100% vegetable fat. It has low phosphorus content and a buffering capacity and amino acid profile similar to that of human milk. The macronutrient composition is consistent with international standards. The detailed composition is as set out in Example 1 above.

Anthropometric Measurements

Weight of infants was measured on a digital scale (Tanita 1583, Salveo, UK) to the nearest 10 g and recumbent length was measured on a standard length board to the nearest 0.1 cm. Z-Scores for weight, length, and Body Mass Index (BMI) were calculated relative to the Euro-Growth references.

Tolerance Records and Faecal Sample Evaluation

For three days preceding each visit, parents recorded volume of formula intake, tolerance, stool characteristics, and any illnesses on specially designed forms. Flatulence, spitting up, and vomiting were rated on a 3-point scale (never, occasional, or often), and restlessness as more or less than three periods of 30 min per day. Additionally, stool frequency was recorded as the number of stools passed in 24 h, and stool characteristics were recorded on a 5-point scale for colour (yellow, brown, green, black, red) and on a 4-point scale for consistency (hard, formed, soft, liquid).

Faecal Sample Collection

On days 30 and 60, 5 to 10 g of faecal sample was collected within 30 min of emission using sterile technique. Samples were placed in an anaerobic jar with an AnaeroGen pack (Oxoid, Hampshire, UK) and stored at 4° C. until transport to the laboratory (within 2 h). Immediately upon arrival at the laboratory, stool samples were placed into cryotubes containing sterile 10% glycerol in Ringers solution (Oxoid, Hampshire, UK), frozen in liquid nitrogen, and stored at −70° C. until analysis.

Bacterial Enumeration by Plating

Faecal samples were processed for culture plating as described previously. Briefly, an aliquot was homogenized, serially diluted in Ringers solution containing 0.5% cysteine, and plated onto the following semi-selective media: Eugon Tomato for *Bifidobacterium* species; NN agar for *C. perfringens*; MRS (Difco, Mich., USA) containing phosphomycine (79.5 mg/l), sulfamethoxazole (0.93 mg/l) and trimethoprime (5 mg/l) for lactobacilli; Drigalski medium (Sanofi Diagnostics Pasteur, Marnes La Coquette, France) for Enterobacteriacae, and azide agar (Difco, Mich., USA) for enterococci. Plates were incubated for 48 h at 37° C. in an anaerobic jar for the detection of bifidobacteria, lactobacilli, and *C. perfringens*, and aerobically for detection of Enterobacteriacae and enterococci. Lactobacilli and bifidobacteria were identified by microscopic examination of colonies and further characterized biochemically using API gallery systems (BioMérieux, Paris, France). Bacterial counts were expressed as log 10 colony forming units (CFU) per gram of fresh faecal sample. The detection limit was 3.3 log 10 CFU/g.

Fluorescence In Situ Hybridization (FISH)

Faecal bacterial counts were determined by FISH as described previously. Total bacterial counts were determined by 4',6-diamidino-2-phenylindole (DAPI) staining. Specific bacterial species were counted using the fluorescently labelled (Cy3) probes, Bif164 for *Bifidobacterium* spp. and His150 specific for the *C. histolyticum* group (including *C. perfringens*), as described previously. Briefly, faecal samples were diluted 1:3 (v/v) in 4% (w/v) formaldehyde and fixed at 4° C. overnight. Samples were then washed with phosphate-buffered saline (PBS), suspended in PBS/ethanol 1:1 (v/v), and stored at −20° C. until further analysis. The appropriate probes (50 ng/μl) were mixed 1:10 with 16 μl of thawed samples that had been diluted in 200 μl of pre-warmed hybridization buffer (40 mM Tris-HCl, 1.8 M NaCl, pH 7.2) and 64 μl HPLC-grade water. Samples were hybridized for 24 h at 50° C., washed with 5 ml of buffer (20 mM Tris-HCl, 0.9 M NaCl, pH 7.2) for 30 min at 50° C., filtered through a 0.2 μm Isopore membrane filter (Millipore, Watford, UK), and stained with DAPI. Following a brief rinse, samples were analyzed under a fluorescence microscope using an excitation filter of 510 nm for Cy3 and 455 nm for DAPI. The detection limit was 7.7 log 10 CFU/g faeces.

Statistical Analysis

Statistical analysis was performed for subjects completing the study at day 60. Faecal bacterial counts were log 10-transformed and compared between groups using the Wilcoxon rank-sums test. Weight gain between days 30 and 60 was calculated by the difference in weight divided by the difference in age, and was analyzed by ANOVA corrected for sex. Stool colour, consistency, and flatulence were analyzed by logistic regression, restlessness, spitting, and vomiting by Wilcoxon rank-sums test, and stool frequency by ANCOVA after correcting for baseline measurements (day 30). All null hypotheses were rejected at a 5% level. Statistical analysis was performed with SAS 8.1 (SAS Institute Inc., Cary, N.C., U.S.A.).

Results

Sixty infants were enrolled, 24 in the breast-fed group and 36 in the formula-fed group. Twenty-one infants in the breast-fed group and 34 in the formula-fed group completed the study (day 60). Baseline characteristics of the 20 breast-fed infants and 33 formula-fed infants (anthropometric measurements for two infants were missing) who completed the study were similar between the two groups.

Safety

Growth: There was no significant difference in weight gain between the two groups on day 60 (ANOVA; P=0.33). Similarly, weight, length, BMI, and Z-scores of infants fed the study formula and breast-fed infants were comparable at both time points (data not shown). On days 90 and 120, the respective Z-scores (±SD) for weight (−0.10±0.98 and −0.19±1.01), length (−0.13±0.91 and −0.30±1.05), and BMI (−0.01±0.92 and 0.02±0.98) also showed that the formula-fed infants continued to grow normally.

Stool frequencies on day 60 were similar in the two groups (ANCOVA; P=0.52). The majority of stools were yellow (66.5% in the formula-fed group vs. 77.3% in the breast-fed group, P=0.06). After one month, there was a predominance of soft and formed stools (82.5% and 67.2% in the formula and breast-fed groups, respectively). Liquid stools were mainly observed in the breast-fed group (4.5% vs. 30.5%, P=0.004), and no hard stools were observed in either group. The mean tolerance values showed no differences in the frequency of flatulence (logistic regression, P=0.23), restlessness, spitting-up or vomiting (Wilcoxon rank-sums test, P>0.1 for all). There was one unspecified serious adverse event in the formula-fed group.

Faecal Microbiota Composition

Only faecal samples that were collected and stored according to the protocol were analyzed. The length of time that infants had been fed with the study formula by the 30-day visit ranged from 3 to 28 days. Thus, it is difficult to evaluate the real impact of the formula on the microbiota at this time point. On day 60, infants had been fed with the study product for 32 to 55 days. Bifidobacteria were detected in 92% of the breast-fed infants and in 91% of the formula-fed infants on day 60. Bifidobacteria counts after one month of intervention (day 60) were not significantly different between the two groups, irrespective of the detection method (Table 1). At the 60-day time point, no significant differences were detected between the formula-fed and the breast-fed groups in any of the other faecal bacterial counts determined with either method.

From Table 1, it may be seen that infants fed NAN® infant formula and those fed breast milk had similar faecal counts of bifidobacteria, clostridia, enterobacteria and enterococci, suggesting that an infant formula with these characteristics may influence the development of an infant's microbiota in a similar way to breast milk. It was not possible to compare bacterial counts on days 30 and 60 since on day 30 infants were still quite heterogeneous with respect to their intake of the study formula (with length of formula intake ranging from as short as three days to as long as 28 days). However, by day 60 all infants in the formula fed group had taken the study formula for at least 30 days.

TABLE 1

Bacterial counts ($\log_{10}$ CFU/g faeces) by FISH (A) and by plate counts (B) on day 60.

| | Breast-Fed (n = 17) | | | |
|---|---|---|---|---|
| | Mean (SD) | Median | Mean (SD) | Median |
| A | | | | |
| | | | Formula-Fed (n = 21) | |
| Bifidobacteria | 8.8 (0.8) | 9.1 | 8.6 (0.6) | 8.8 |
| Clostridia | 7.8 (0.2) | 7.7 | 7.8 (0.2) | 7.7 |
| Total counts | 9.8 (0.2) | 9.8 | 9.7 (0.3) | 9.8 |
| B | | | | |
| | | | Formula-Fed (n = 22) | |
| Bifidobacteria | 7.8 (3.2) | 9.6 | 7.2 (3.3) | 9.0 |
| *C. perfringens* | 4.1 (1.6) | 3.0 | 3.9 (1.4) | 3.0 |
| Enterobacteria | 8.9 (0.9) | 9.08 | 9.41 (0.95) | 9.33 |
| Enterococci | 6.3 (2.4) | 7.2 | 7.3 (2.2) | 8.2 |
| Lactobacilli | 5.4 (2.2) | 6.0 | 5.5 (2.1) | 5.6 |

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of manufacturing a nutritional composition, the method comprising:
    combining at least whey protein, a phosphorus source, lactose, water, a fat source having a ratio of n-6 to n-3 fatty acids ranging from about 5:1 to about 15:1, and an ingredient selected from the group consisting of lactoferrin, probiotics and a combination thereof to form a liquid composition, wherein the liquid composition has a phosphorus content of less than 40 mg/100 kcal and a protein content of less than 2.1 g protein/100 kcal, wherein the whey protein is a predominant protein of the protein content, the protein content includes partially hydrolyzed proteins having a degree of hydrolysis between 2 and 20%, and the whey protein has an extent of lysine blockage that is less than 10% by weight of lysine; and
    spray drying or freeze drying the liquid composition to form a powder having a moisture content of less than about 5% by weight.

2. The method of claim 1, wherein the nutritional composition is an infant formula.

3. The method of claim 1, wherein the whey:casein ratio is at least 60:40.

4. The method of claim 1, wherein the protein content of the composition is from 1.7 to 1.9 g/100 kcal.

5. The method of claim 1, wherein the phosphorus content of the composition is between 26 and 33 mg/100 kcal.

6. The method of claim 1, wherein the composition has a calcium ratio of calcium and phosphorus in the composition of between 1.8 and 2.0.

7. The method of claim 1, wherein the composition has a lactose content of at least 10 g/100 kcal.

8. The method of claim 1, wherein lactose constitutes 100% of the carbohydrate content of the composition.

9. A method for reducing the risk of subsequent development of an allergy in infants, the method comprising administering a nutritional composition to an infant wherein the nutritional composition comprises an ingredient selected from the group consisting of lactoferrin, probiotics and a combination thereof and has a phosphorus content of less than 40 mg/100 kcal, a fat source having a ratio of n-6 to n-3 fatty acids ranging from about 5:1 to about 15:1, and a protein content of less than 2.1 g protein/100 kcal, wherein whey protein is a predominant protein of the protein content, the protein content includes partially hydrolyzed proteins having a degree of hydrolysis between 2 and 20%, and the whey protein has an extent of lysine blockage that is less than 10% by weight of lysine.

10. The method of claim 9, wherein the nutritional composition is an infant formula.

11. The method of claim 9, wherein the whey:casein ratio is at least 60:40.

12. The method of claim 9, wherein the protein content of the composition is from 1.7 to 1.9 g/100 kcal.

13. The method of claim 9, wherein the phosphorus content of the composition is between 26 and 33 mg/100 kcal.

14. The method of claim 9, wherein the composition has a calcium ratio of calcium and phosphorus in the composition of between 1.8 and 2.0.

15. The method of claim 9, wherein the composition has a lactose content of at least 10 g/100 kcal.

16. The method of claim 9, wherein lactose constitutes 100% of the carbohydrate content of the composition.

17. A method for promoting the development of an early bifidogenic intestinal microbiota in infants, the method comprising administering to an infant a nutritional composition comprising an ingredient selected from the group consisting of lactoferrin, probiotics and a combination thereof wherein the nutritional composition has a phosphorus content of less than 40 mg/100 kcal, a fat source having a ratio of n-6 to n-3 fatty acids ranging from about 5:1 to about 15:1, and a protein content of less than 2.1 g protein/100 kcal, wherein whey protein is a predominant protein of the protein content, the protein content includes partially hydrolyzed proteins having a degree of hydrolysis between 2 and 20%, and the whey protein has an extent of lysine blockage that is less than 10% by weight of lysine.

18. The method of claim 17, wherein the nutritional composition is an infant formula.

19. The method of claim 17, wherein the whey:casein ratio is at least 60:40.

20. The method of claim 17, wherein the protein content of the composition is from 1.7 to 1.9 g/100 kcal.

21. The method of claim 17, wherein the phosphorus content of the composition is between 26 and 33 mg/100 kcal.

22. The method of claim 17, wherein the composition has a calcium ratio of calcium and phosphorus in the composition of between 1.8 and 2.0.

23. The method of claim 17, wherein the composition has a lactose content of at least 10 g/100 kcal.

24. The method of claim 17, wherein lactose constitutes 100% of the carbohydrate content of the composition.

* * * * *